(No Model.)  
2 Sheets—Sheet 1.

C. & S. T. JOHNSTON.
ROTARY PLOW AND PULVERIZER.

No. 315,947.  
Patented Apr. 14, 1885.

WITNESSES

Columbus Johnston  
S. T. Johnston  
INVENTOR

By C. A. Snow & Co.  
Attorneys

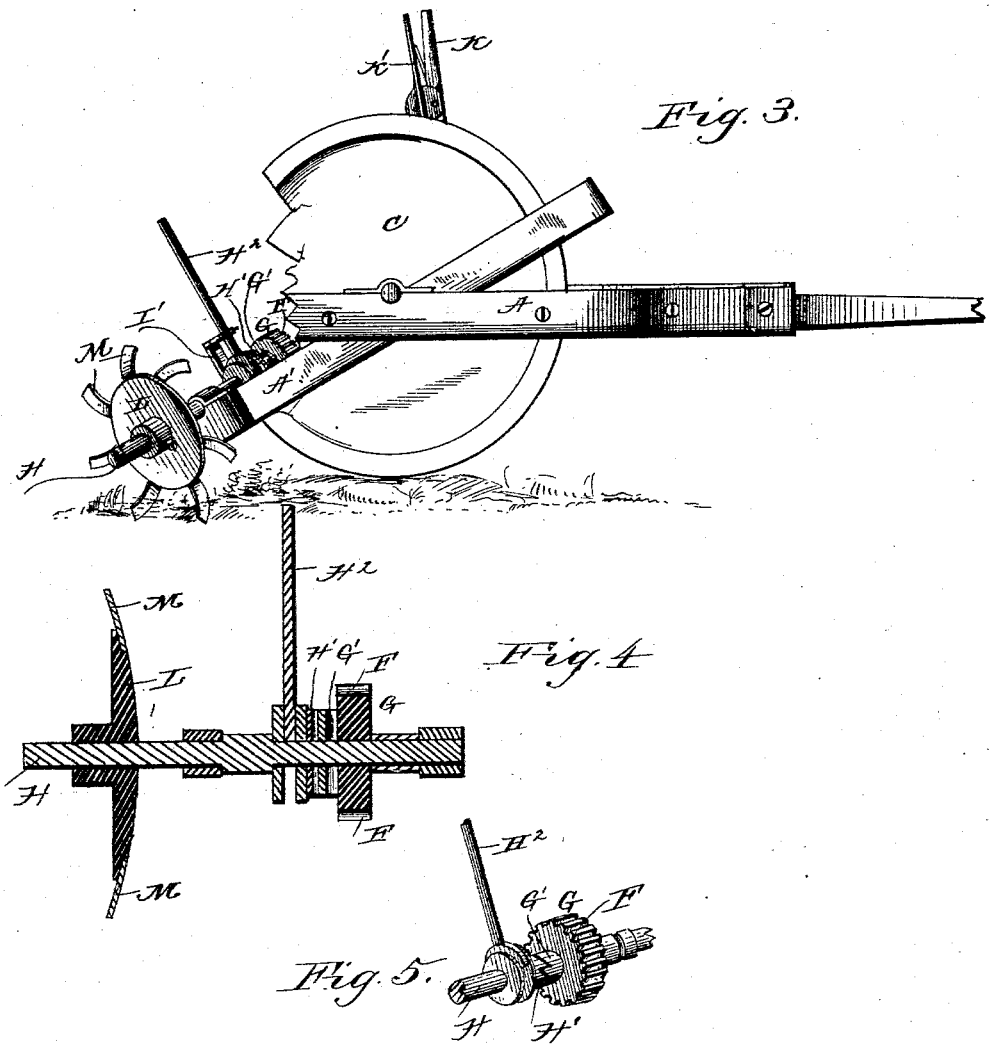

UNITED STATES PATENT OFFICE.

COLUMBUS JOHNSTON, OF CLARKSVILLE, AND SYLVESTER T. JOHNSTON, OF ST. LOUIS, MISSOURI.

ROTARY PLOW AND PULVERIZER.

SPECIFICATION forming part of Letters Patent No. 315,947, dated April 14, 1885.

Application filed September 8, 1884. (No model.)

*To all whom it may concern:*

Be it known that we, COLUMBUS JOHNSTON and SYLVESTER T. JOHNSTON, citizens of the United States, residing, respectively, at Clarksville and St. Louis, in the counties of Pike and St. Louis and State of Missouri, have invented a new and useful Improvement in Rotary Plows and Pulverizers, of which the following is a specification, reference being had to the accompanying drawings.

Our invention has relation to rotary plows and pulverizers; and it consists in the construction and novel arrangement of the parts, as will be hereinafter fully described, and particularly pointed out in the claims.

Figure 1:
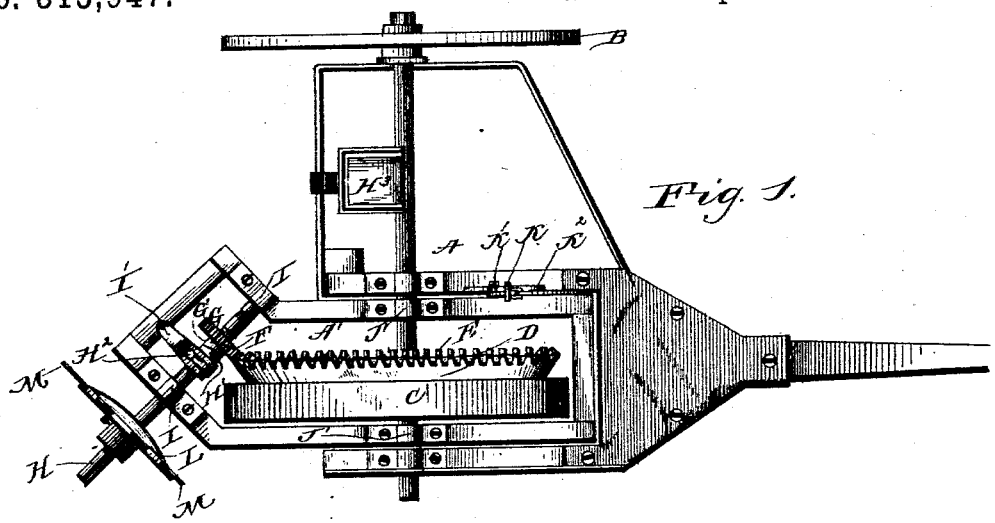
Figure 2:
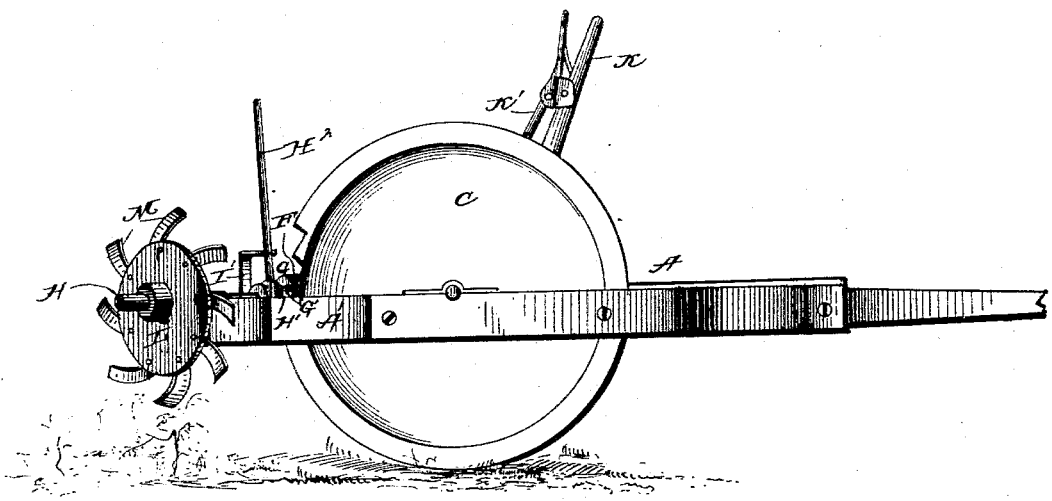

In the drawings, Figure 1 is a plan view of a plow and pulverizer embodying our improvements. Fig. 2 is a side elevation. Fig. 3 is a side view, a portion being broken away to show the gearing. Figs. 4 and 5 are detail views.

Referring by letter to the accompanying drawings, A designates a frame, of any suitable construction, mounted on wheels B and C, the latter of which is the drive-wheel, and is provided on its inner face with a gear-wheel, D, the teeth E of which engage the teeth F of a pinion, G, on the cutter-shaft H, which is mounted in bearings I on the auxiliary frame A' at an angle of about thirty degrees relatively to the drive-wheel C. On its rear face the pinion G is provided with a half-clutch, G', which is adapted to engage with a sliding half-clutch, H', on the cutter-shaft H. A lever, $H^2$, is used to operate the sliding half-clutch H, and said lever $H^2$ is fulcrumed in a standard, I', within convenient reach of the driver's seat $H^3$, which is secured to the frame A in the rear of the axle.

A' designates the auxiliary frame, which is built around the drive-wheel C, and is connected to the axle by boxes J'. This auxiliary frame A' is provided with a lever, K, having a spring-actuated detent, K', which can be made to engage with either of a series of notches in an arc-shaped rack, $K^2$, upon the main frame, to provide for the proper adjustments of the auxiliary frame A'.

Upon the rear end of the cutter-shaft H is a disk, L, which is mounted on the shaft so as to rotate therewith, and is provided with knives or cutters M, which are curved, as shown, but are not twisted, and the edges of these knives M are set farther to the front than the backs of the knives are, as shown. The face of the disk L is beveled, and the knives are secured to the front of the disk in the position that when they are in the ground to the depth that it is desired to plow they will point straight down from or slightly to the rear of the place at which they are bolted onto the disk. This construction causes the points of the knives to run slightly to the rear of the heels of the knives while in the ground, so that the dirt is sliced and thrown out when the machine is at work, thereby thoroughly pulverizing the dirt. The cutters are substantially bolted to the disk, which is fixed to the cutter-shaft H, and the lever K is employed to hold the auxiliary frame in the required position, to lower it to place, and to raise it to avoid an obstruction. By this lever K the cutters are forced into the ground the desired depth and held firmly. Should the cutters strike an obstruction while in operation, the lever $H^2$ will be thrown out of gear or a knife will be broken or injured, provided the driver does not raise the cutters out of the ground to avoid the obstruction.

Having thus fully described our invention, what we claim as new, and desire to secure by Letters Patent of the United States, is—

1. The combination, with the main frame having the supporting-wheel, and the drive-wheel having the toothed ring on its inner face, of the cutter-shaft provided with the pinion having the half-clutch, the disk L, and knives M, the tilting frame, and mechanism, substantially as described, for tilting and holding the auxiliary frame, as set forth.

2. The combination, with the main frame having the supporting-wheel, and the toothed drive-wheel provided with the toothed ring on its inner face, of the auxiliary frame provided with the cutter-shaft having the disk provided with curved knives, the sliding clutch and its operating-lever, and the spring-actuated lever for operating the tilting frame, substantially as specified.

In testimony that we claim the foregoing as our own we have hereto affixed our signatures in presence of two witnesses.

COLUMBUS JOHNSTON.
SYLVESTER T. JOHNSTON.

Witnesses:
JOHN P. ELLIS,
JOHN D. DEITERING.